April 15, 1958     M. G. BYSTROM     2,830,821
LATHE STOP
Filed Jan. 20, 1956
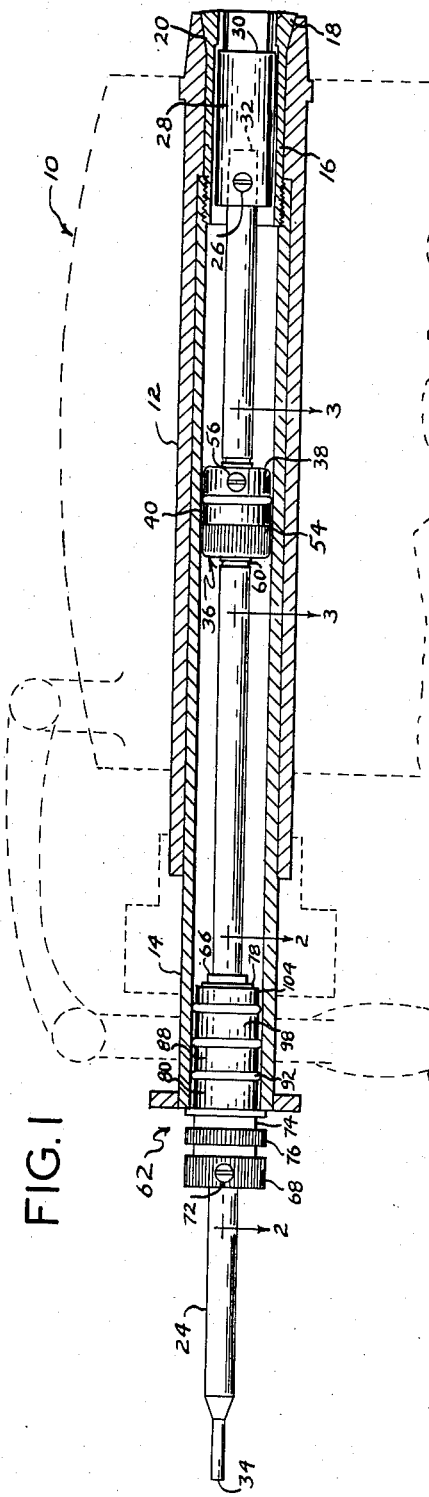
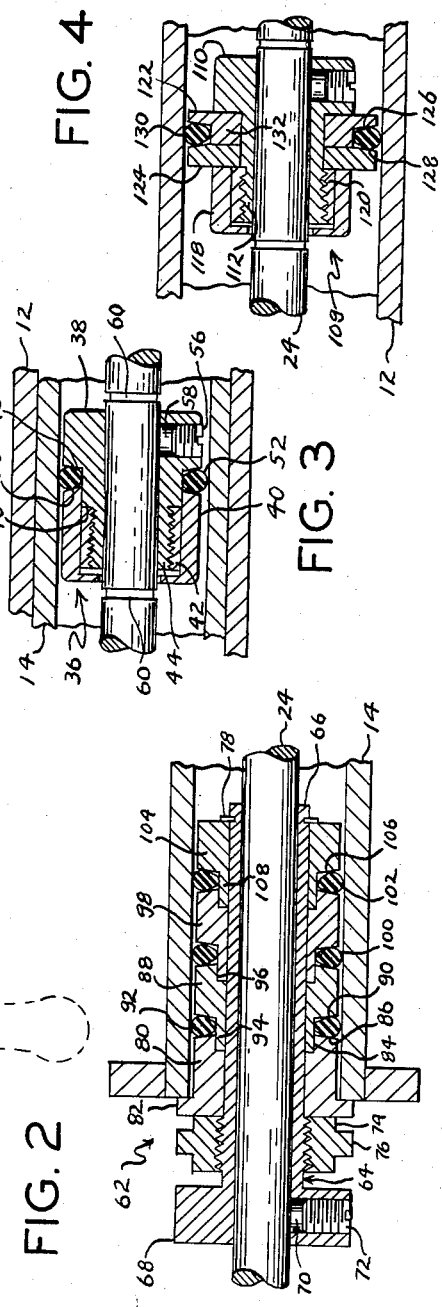
INVENTOR.
MIKEAL G. BYSTROM
BY Stuart R. Peterson
ATTORNEY United States Patent Office 2,830,821
Patented Apr. 15, 1958

2,830,821

LATHE STOP

Mikeal G. Bystrom, Minneapolis, Minn.

Application January 20, 1956, Serial No. 560,329

12 Claims. (Cl. 279—2)

This invention relates to work stops and pertains more particularly to a device of this character which will find especial utility in the positioning of work pieces for the performance of various lathe operations thereon.

One object of the invention is to provide a lathe stop that will be exceedingly versatile in its functioning. In this regard, it is an aim of the invention to minimize the set-up time required in the effecting of second operations, such as counterboring, chamfering and facing of relatively small parts. Also, the invention has for a desideratum the facile adjustment of the stop mechanism for work pieces of various sizes and shapes. More specifically, the invention contemplates a longitudinal adjustment of the stop head plus an interchangeability of ends so as to afford a selection of head diameters.

Another obect of the invention resides in the avoidance of threads and recesses at vulnerable locations on the stop mechanism where chips and foreign matter are kept to accumulate.

Another object is to provide a stop that will have a firm gripping action without pushing back or slippage which of course cannot be tolerated where the work must be accurately held for precision cuts. Further, the above alluded to positive gripping action is achieved frictionally without danger of scoring the walls of the draw or spindle tube (as the case may be) during insertion, adjustment or withdrawal of the stop mechanism.

A further object is to so distribute the loading or gripping force that the spindle tube will not become expanded and distorted to such an extent that its bearings will be adversely affected.

A very important object also is the fact that for all intents and purposes misalignment in general is corrected. For instance, it is common knowledge that the bores of draw tubes are inaccurate, or at least cannot be relied upon as being accurate, especially since they are not ground. Although the aforementioned distributed loading has the advantage of compensating for localized inaccuracies, the stop mechanism forming the subject matter of the instant invention lends itself readily to a turning of the stop blank, as will hereinafter become manifest, in such a fashion that a stop head will be produced having a perfectly true face for the particular bore in which it has been inserted.

Yet another advantage obtainable with the present invention is the location of the stop so that it is not supported by the bore of the collet, such a bore also being quite inaccurate in its dimensions unless specifically designed for the accommodation of a stop which of course increases the collet cost.

A still further object of the invention resides in the use of standard rubber O rings. Not only does this permit easy and inexpensive replacement when necessary but such a resilient mounting of the stop head absorbs the shock and vibration that would otherwise be transmitted.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

Figure 1 is an elevational view of the stop mechanism, the head stock being generally depicted in phantom outline and the conventional collet, draw tube and spindle tube being in section in order to highlight the lathe stop itself;

Figure 2 is a sectional view taken in the direction of line 2—2 of Figure 1 to show on a larger scale the manner in which one end of the rod is supported;

Figure 3 is a sectional view in the direction of line 3—3 of Figure 1 showing how the other end of the rod is supported, and Figure 4 is a view somewhat similar to Figure 3 but depicting a modified construction of the follower unit which permits its use directly within spindle tubes of various sizes.

Referring now in detail to the drawing, a conventional lathe headstock has been pictured in dotted outline and designated in its entirety by the numeral 10. Journaled for rotation within the headstock 10 is a spindle tube 12 rotatably driven by a motor (not shown). The spindle tube 12 has received in its bore a draw tube 14 having a threaded connection with a collet 16 equipped with a series of spring fingers 18. The spring fingers 18 have outer inclined or beveled faces 20 which engage a substantially complementally tapered end of the spindle tube. Through the agency of a handle 22 and intermediate mechanism, not important to a understanding of the invention presently to be described, the tube 14 and its attached collet 16 may be drawn (to the left as viewed in Figure 1) into the spindle tube 12, the beveled faces 20 causing the fingers 18 to flex inwardly against the work piece which is to be held by the collet.

Describing now the lathe stop itself, it is to be discerned that this mechanism comprises an elongated rod 24 disposed within the bore of the draw tube 14. In the illustrated situation one end of the rod 24 has secured thereto by means of a set screw 26 a separate stop head 28. Of course, employment of the extra member in the form of the stop head 28 is mainly a matter of discretion, governed largely by the bore diameter of the collet 16 and the size of work to be gripped thereby. As shown, the work would abut the end 30 of the head 28, whereas when such a head as a separate member is omitted then the end 32 of the rod 24 would serve in this capacity. Also it is believed obvious that instead of a one-piece head member 28 there may be used a spring actuated ejector which will force the work piece out of the collet 16 when the draw tube 14 is moved to the right to release the spring fingers or jaws 18. The versatility and size adaptation is further enhanced by the interchangeability of ends, for the invention envisages a reduced diameter opposite end 34 which may assume the position of the head member 28 or the end 32 when the collet and work sizes so require. Stated somewhat differently, the rod may be turned end to end or through 180 degrees to present a stop of different dimensions to the work.

Included as a part of the stop mechanism is a follower unit 36 comprising a first sleeve 38 circumscribing the rod 24 and a second sleeve 40 provided with an internally threaded insert 42 press fitted or otherwise securely retained within said second sleeve. By reason of a threaded collar 44 integral with the sleeve 38 relative rotation of said sleeves will determine their position with respect to each other. However, engagement of an annular shoulder 46 on the sleeve 38 with the neighboring end of the insert 42 limits the relative advancement of the two sleeves. This limiting action is extremely desirable inas much as each sleeve 38, 40 is formed with a beveled edge 48, 50, respectively. The two edges 48, 50 coact in providing a circumferential groove for the reception of an O ring member 52, such as rubber, neoprene or the like. Consequently, it is believed readily apparent that advancement of one sleeve with respect to the other will create a pressural action against the O ring, urging same radially outwardly into engagement with the inner wall of the tube 14. It might be explained that the O ring 52 (as are others hereinafter referred to) is circular in cross-section but is distorted into the oval configuration shown due to the force applied by the edges 48, 50. Other cross-sectional configurations can be used, however. In effecting the advancement, it is to be observed that the outer surface of the sleeve 40 is suitably knurled at 54 so that this sleeve may be manually rotated during the step of inserting the follower unit into the draw tube 14. On other hand, the sleeve 38 is fixedly secured to the rod 24 by a set screw 56 which abuts against a block or pad 58 (Figure 3) of softer material than the rod 24 so as to preserve the surface of said rod. Slightly indented, longitudinally spaced grooves 60 serve as a ready guide for the positioning of the above-described follower unit on the rod 24.

Focusing attention now on the manner in which the other end of the rod 24 is supported within the draw tube 14, it can be observed from Figures 1 and 2 that a lock unit 62 encircles the rod 24 in the region adjacent the end of the draw tube 14 which is remote from the collet end 16. This unit 62 differs considerably from the unit 36, being comprised of an axle 64 having a tubular sleeve portion 66 and a knurled knob 68. The knob 68 is provided with a radial aperture for the accommodation of a block or pad 70 similar to the earlier mentioned pad 58 and a threadedly received set screw 72 which bears against the pad in order to make the axle fast with respect to the rod 24.

The tubular sleeve portion 66 has a threaded section adjacent the knob 68, there being a lock nut 74 equipped with a knurled flange 76 for facilitating turning thereof. The other end of the tubular sleeve 66 has a small circumferential groove extending thereabout for the reception of a split locking ring or washer 78. Interposed between the lock nut 74 and the locking ring 78 is a plurality of sleeves. The first sleeve 80 is formed with a flange 82 which is of sufficient diameter so as to abut against the end of the draw tube 14 and thus aid in the positioning of the assembly or unit 62 on the rod 24, although the set screw 72 is instrumental in retaining the unit in place. The sleeve 80 is counterboared at 84 and beveled at 86 for reasons presently to be explained.

There is another sleeve 88 also provided with a beveled surface 90 which cooperates with the beveled surface 86 to form an annular groove for the reception of a resilient O ring 92 similar to the one 52 hereinbefore referred to. By reason of a tubular collar 94 on the sleeve 88 the minimum width of the annular groove is limited, inasmuch as this collar will engage the bottom of the counterbore 84 thus avoiding the application of excessive pressure on the O ring. Like the sleeve 80, the sleeve 88 is formed with a counterbore 96.

Another sleeve 98 encircles the tubular portion 66 and since this sleeve is of identical configuration when compared with the sleeve 80 it will not be described in detail. However, it is to be noted that it coacts with the sleeve 80 to force an O ring 100 against the bore of the draw tube 14, thereby supplementing the action derived from the O ring 92. A third O ring 102 is also acted upon in a similar fashion, owing to the use of a further sleeve 104. Because the sleeve 104 is provided with a beveled surface 106 and a collar 108 which function in the same manner as those previously mentioned, there is no need for a second beveled surface or counterbore inasmuch as this sleeve 104 is intended to be the last sleeve in the series abutting the split locking ring 78.

From the foregoing the operation of the lathe stop is believed readily apparent. However, a brief outline of the steps involved may prove of advantage in appreciating the benefits to be derived. Therefore, we will assume that the head stop member 28 is desired in the exemplified instance and has been attached to the rod 24 by means of the set screw 26. Having done this, the follower unit 36 may be placed on the rod 24 and slid toward the member 28 until it resides between the two grooves 60. Tightening of the set screw 56 will of course make the sleeve 38 fast on the rod 24. With the other sleeve 40 retracted or unscrewed somewhat there is little or no radial expansion of the single O ring 52, thus permitting its ready insertion into the bore of the draw tube 14 when the rod 24 is moved manually in this direction, that is to the right as viewed in Figure 1. Once the O ring 52 is within the left end of the draw tube 14 with the knurled region 54 of the sleeve 40 still exposed and accessible for turning by hand, it will be evident, it is thought, that tightening of this sleeve relative to the sleeve 38 will narrow the gap of the groove formed by the beveled edges 48, 50 causing progressive radial expansion of the O ring 52 against the bore of the tube 14. The lathe operator, however, stops the tightening process before the wedging action becomes too great, for the rod 24 and the follower unit 36 must be sufficiently free to be slid forwardly in the tube 14 until the end 30 is properly located for the depth of the work to be held in the collet 16.

The locking unit 62 can be applied to the rod 24 at almost any time, since no part thereof enters the tube 14 until the follower unit 36 has been moved well into said tube. It might be pointed out at this time that the advancement of the follower unit into the tube performs a cleaning action as it progresses forwardly due to the fact that its O ring 52 will push any chips or the like ahead of it. In this way no foreign matter can remain which can throw the assemblage off center.

At any rate the locking unit 62 has the lock nut 74 which can be backed off sufficiently so as to permit entry of the various O rings 92, 100 and 102 into the bore of the draw tube 14 because of the lack of O ring expansion under these conditions. If desired, the unit 62 may be inserted until the flange 82 strikes the tube 14, although this is optional.

Tightening of the nut 74 will cause each sleeve 80, 88, 98 and 104 to move axially along the tubular portion 66 of the axle 64. However, these sleeves are held captive by the ring 78 and compression of the several O rings 92, 100 and 102 results in their radial expansion outwardly against the tube 14. As hereinbefore mentioned, though, there is a limit to the extent the O rings can be urged against the bore of this tube, the various counterbores and received collars providing this limiting action.

Until the set screw 72 is tightened the rod 24 is still free to be moved longitudinally. In this way the end 34 can be adjusted for its correct location. If the work piece is to extend quite far into the collet, then of course the stop head 28 (we are assuming that the member 28 is employed for this lathe operation) will be spaced inwardly a considerable distance. Otherwise, it will not. After this adjustment all that remains to be done is to tighten the set screw 72. The lathe stop is then ready and the work piece can be gripped in the collet 16 with the assurance that it will enter only to the proper depth.

One feature of the invention that warrants a more detailed explanation is that dealing with alignment. For example, should the bore of the draw tube 14 be untrue with the bore of the collet 16 any such angularity may be easily compensated for. In this regard the lathe stop is mounted as above-outlined but the member 28 can be adjusted by longitudinally moving the rod 24 (only the loosening of the set screw 56 is necessary to do this) until the end 30 thereof projects beyond the collet 16. Tightening of the set screw 56 will then anchor the head 28 so that a facing cut can be made on its end 30 to make this end lie in a plane perpendicular to the axis of rotation. This perpendicularity may be preserved by loosening the set screw 56 and taking care to pull the rod 24 and the member 28 back the required distance without imparting any rotation to the rod relative to the draw tube. Re-tightening of the set screw will assure retention of the stop in the proper location. Even though the stop is adjusted longitudinally for different work pieces, as long as there is no rotation of the rod 24 while so doing the end 30 will remain correct so that there will be no cocking of the work piece within the collet.

Up to this point the description has been concerned with the disposition of the lathe stop within a draw tube. While collets come in various sizes for holding rather small work pieces, nonetheless quite large pieces are normally held by a chuck attached to the outside of the spindle tube. In such situations the draw tube is not used, for it is only utilized in actuating the collet. Accordingly, as stated generally hereinbefore, the invention has for an object the modification of the follower unit 36 to the extent that it may be mounted directly within spindle tubes of various sizes without having to have a different follower unit for each differently dimensioned spindle tube.

With regard to the modification proposed above, attention is directed at this time to Figure 4. In this figure it will be seen that the spindle tube for the sake of illustration and comparison is the same as that already referred to, therefore bearing the same reference numeral 12.

Circumscribing that portion of the rod 24 pictured in Figure 4 is a follower unit 109 including a sleeve 110, much like the sleeve 38, provided with a threaded collar 112, however, that is somewhat longer. Also, there is a pad 114 against which a set screw 116 abuts to anchor the sleeve 110. A second sleeve 118 having a threaded insert 120 firmly anchored therein cooperates with the sleeve 110 to the extent of creating a pressural action on a pair of washers or annular discs 122, 124 circomposed about the unthreaded body of the collar 112. The disc 122 has a beveled edge 126 innerjacent its periphery and the other disc 124 is similarly provided with a beveled edge 128, the two acting to produce an annular groove for the accommodation of an O ring 130. The O ring is of sufficient diameter so that when the sleeves 110 and 118 are tightened or moved together the ring 130 is expanded radially to engage the bore of the spindle tube 12. However, by virtue of a collar or boss 132 on the disc 122 the degree of force applied to the O ring 130 is limited to a reasonable and safe value.

Thus, it can be seen that both the follower units 36 and 109 play a supporting role that prevents whipping of the rod 24, whether the rod be disposed in either a draw tube or spindle tube. In addition to centering the rod 24 within the bore the follower units 36 and 109 also assist in preventing the rod from shifting within the tube. However, responsibility for preventing the axial shifting rests primarily with the locking unit 62. In this regard, it is to be remembered that this unit 62 is furnished with three O rings 92, 100 and 102, affording greater anchorage by reason of the added number of O rings coupled with the fact that they can be compressed more, that is tightened to a greater degree by the nut 74, because adjustment is made from the outside and such adjustment can be final in contradistinction to the follower unit 36 which must be slid within the tube to its operable position.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A work stop for disposition within a rotary tube forming part of the headstock of a lathe, the stop mechanism comprising an elongated rod element provided with one end against which the work to be machined can abut, a first unit circumscribing said rod element including circumferentially expansible means engageable with one annular portion of the bore of said tube, and a second unit circumscribing said rod element including circumferentially expansible means engageable with another annular portion of said bore longitudinally spaced from said one portion.

2. A work stop for disposition within a rotary tube forming part of the headstock of a lathe, the stop mechanism comprising an elongated rod element provided with one end against which the work to be machined can abut, a first unit circumscribing said rod element including a pair of members adjustable axially relative to each other to form an annular groove and a flexible element disposed in said groove for engaging one portion of the bore of said tube when said members are urged sufficiently against said flexible element, and a second unit circumscribing said rod element including a pair of members adjustable axially relative to each other to form an annular groove and a flexible element disposed in said groove for engaging another portion of said bore longitudinally spaced from said one portion.

3. A work stop for disposition within a rotary tube forming part of the headstock of a lathe, the stop mechanism comprising an elongated rod element provided with one end against which the work to be machined can abut, a first unit circumscribing said rod element including a pair of members threadedly connected together to form an annular groove and a resilient element disposed in said groove for engaging one portion of the bore of said tube when said members are tightened sufficiently against said resilient element, and a second unit circumscribing said rod element including a sleeve member provided with a threaded section, a nut member threadedly engaged with said section, a plurality of sleeve elements encircling said sleeve member forming an annular groove, a resilient element disposed in said last named groove and means carried by said sleeve member for absorbing the thrust of said sleeve elements when said nut member is advanced against said sleeve elements to cause said last named resilient element to engage another portion of said bore spaced longitudinally from said first portion.

4. A stop mechanism for use within the bore of a lathe draw tube or spindle tube, the mechanism comprising an elongated rod element, and a pair of longitudinally spaced units for supporting the rod within the draw or spindle tube, each unit including a pair of axially adjustable sleeve member circumscribing portions of said rod element and yieldable means actuatable by relative movement of said sleeve members to cause respective engagement of said yieldable means against the bore of said draw or spindle tube.

5. A stop mechanism in accordance with claim 4 in which said rod element is reversible, having one end of smaller cross-section than the other end.

6. A stop mechanism for use within the bore of a lathe draw tube or spindle tube, the mechanism comprising an elongated rod element, a follower unit encircling one portion of said rod element including first and second sleeves having a threaded connection with each other for relative displacement in an axial direction, and a yieldable ring actuatable by said sleeves when moved toward each other for expansion in a radial direction to engage the bore of said draw or spindle tube, and a locking unit encircling another portion of said rod element spaced longitudinally from said first portion including a tubular member circumjacent said rod element, a series of sleeves circumscribing said tubular member, a yieldable ring actuatable by each pair of adjacent sleeves when moved toward each other for expansion of the various rings in a radial direction to engage collectively the bore of said draw or spindle tube.

7. A stop mechanism in accordance with claim 6 including means for anchoring one of the sleeves of the follower unit to said rod element to prevent movement of said follower unit therealong, and means for anchoring said tubular member of the locking unit to prevent movement of this unit along said rod element also.

8. A stop mechanism for use within the bore of a lathe draw tube or spindle tube, the mechanism comprising an elongated rod element, a follower unit encircling one portion of said rod element including a pair of threadedly connected sleeve members provided with neighboring beveled surfaces forming a circumferential groove, a rubber O ring disposed in said groove for radial expansion against the bore of said draw or spindle tube when said sleeves are relatively rotated to move the beveled surfaces closer together and means for rendering one of said sleeve members immobile on said rod element, and a locking unit encircling another portion of said rod element including an elongated tubular sleeve circumjacent the rod element having a threaded portion adjacent one end and radially extending means adjacent the other end, a nut member received on said threaded portions, and a series of sleeves between said nut member and said radially extending means, adjacent sleeves in said series having neighboring beveled surfaces forming a plurality of circumferential grooves.

9. A stop mechanism in accordance with claim 8 including means on the sleeves of each of said units which limits their movement toward each other to thereby govern the widths of the respective grooves.

10. A stop mechanism in accordance with claim 9 in which each of said immobile rendering means includes a set screw and the elongated tubular sleeve is equipped with a knob by which said tubular sleeve may be gripped while the nut member is rotated.

11. A work stop for disposition within a rotary tube forming part of the headstock of a lathe, the stop mechanism comprising an elongated rod element provided with one end against which the work to be machined can abut, a first unit circumscribing said rod element to support said one end of the rod element including a pair of sleeve members, one sleeve member having an integral collar the free end of which is threadedly received within the other sleeve member, a pair of beveled washers circumposed about one longitudinal section of said collar and engageable by portions of said sleeve members, the beveled surfaces of said washers forming a circumferential groove and a flexible element disposed in said groove for engaging one portion of the bore of said tube when said washers are urged against said flexible element by said sleeve members, and a second unit for supporting the other end of said rod element within said tube.

12. A work stop in accordance with claim 11 in which said flexible element constitutes a rubber O ring and one of said washers is provided with a projection for limiting movement of said beveled surfaces toward each other so as to prevent the application of excessive pressure on said O ring.

References Cited in the file of this patent
UNITED STATES PATENTS

| | | |
|---|---|---|
| 2,361,085 | Carlson | Oct. 24, 1944 |
| 2,647,701 | Cannard | Aug. 4, 1953 |
| 2,746,497 | Thompson | May 22, 1956 |
| 2,749,133 | Rich | June 5, 1956 |
| 2,756,059 | Knapp | July 24, 1956 |

U. S. DEPARTMENT OF COMMERCE
PATENT OFFICE

CERTIFICATE OF CORRECTION

Patent No. 2,830,821    Mikeal G. Bystrom    April 15, 1958

It is hereby certified that error appears in the printed specification of the above numbered patent requiring correction and that the said Letters Patent should read as corrected below.

Column 1, line 32, for "kept" read -- apt --.

Signed and sealed this 3rd day of June 1958.

(SEAL)
Attest:

KARL H. AXLINE
Attesting Officer

ROBERT C. WATSON
Commissioner of Patents